United States Patent
Leung et al.

(10) Patent No.: US 7,447,162 B1
(45) Date of Patent: Nov. 4, 2008

(54) METHODS AND APPARATUS FOR ANCHORING OF MOBILE NODES USING DNS

(75) Inventors: Kent K. Leung, Mountain View, CA (US); Milind M. Kulkarni, San Jose, CA (US); Alpesh Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 10/187,084

(22) Filed: Jun. 28, 2002

Related U.S. Application Data

(60) Provisional application No. 60/362,251, filed on Mar. 5, 2002.

(51) Int. Cl.
| | |
|---|---|
| H04L 12/26 | (2006.01) |
| H04L 12/28 | (2006.01) |
| H04Q 7/00 | (2006.01) |
| H04Q 7/24 | (2006.01) |

(52) U.S. Cl. .................. 370/252; 370/328; 370/338; 370/400

(58) Field of Classification Search .............. None
See application file for complete search history.

(56) References Cited

U.S. PATENT DOCUMENTS

| | | | |
|---|---|---|---|
| 6,161,123 A | 12/2000 | Renouard et al. | |
| 6,163,843 A | 12/2000 | Inoue et al. | |
| 6,167,513 A | 12/2000 | Inoue et al. | |
| 6,230,012 B1 | 5/2001 | Willkie et al. | |
| 6,233,616 B1 | 5/2001 | Reid | |
| 6,339,830 B1 | 1/2002 | See et al. ............... | 713/202 |
| 6,421,714 B1 | 7/2002 | Rai et al. | |
| 6,427,170 B1 | 7/2002 | Sitaraman et al. | |
| 6,442,616 B1 | 8/2002 | Inoue et al. | |
| 6,463,134 B1 | 10/2002 | Okada et al. | |
| 6,515,974 B1 | 2/2003 | Inoue et al. | |
| 6,567,664 B1 | 5/2003 | Bergenwall et al. | |
| 6,636,894 B1 | 10/2003 | Short et al. | |
| 6,654,359 B1 | 11/2003 | La Porta et al. | |
| 6,681,259 B1 | 1/2004 | Lemilainen et al. | |
| 6,687,245 B2 | 2/2004 | Fangman et al. | |
| 6,728,718 B2 | 4/2004 | Banjeree et al. | |

(Continued)

FOREIGN PATENT DOCUMENTS

EP      1 126 682 A      8/2001

OTHER PUBLICATIONS

Alessandra Giovanardi, Transparent Mobile IP: an Approach and Implentation, 1997, IEEE, pp. 1861-1865.*

(Continued)

*Primary Examiner*—Steven H. D Nguyen
(74) *Attorney, Agent, or Firm*—Weaver Austin Villeneuve & Sampson LLP

(57) ABSTRACT

Methods and apparatuses for obtaining home agent assignment. The invention uses a DNS query to signal a request for dynamic home agent assignment. The DNS query will cause a content routing device to be notified that home agent assignment is being requested. The content routing device can then use predetermined metrics to select a home agent. A DNS response will then be sent back to the device that initiated the DNS query containing the IP address of the selected home agent.

20 Claims, 7 Drawing Sheets

U.S. PATENT DOCUMENTS

| | | | |
|---|---|---|---|
| 6,742,036 B1* | 5/2004 | Das et al. | 709/226 |
| 6,766,168 B1 | 7/2004 | Lim | |
| 6,771,623 B2 | 8/2004 | Ton | |
| 6,778,528 B1* | 8/2004 | Blair et al. | 370/475 |
| 6,839,337 B2 | 1/2005 | Newberg et al. | |
| 6,892,069 B1 | 5/2005 | Flynn | |
| 6,954,790 B2 | 10/2005 | Forslow | |
| 6,973,057 B1* | 12/2005 | Forslow | 370/328 |
| 7,031,275 B1* | 4/2006 | Borella et al. | 370/328 |
| 7,042,988 B2 | 5/2006 | Juitt et al. | |
| 2001/0014917 A1 | 8/2001 | Ishiyama et al. | |
| 2002/0052954 A1 | 5/2002 | Polizzi et al. | |
| 2002/0058480 A1 | 5/2002 | Ikeda | |
| 2002/0073182 A1 | 6/2002 | Zakurdaeev et al. | |
| 2002/0089958 A1* | 7/2002 | Feder et al. | 370/338 |
| 2002/0114323 A1* | 8/2002 | Chowdhury et al. | 370/352 |
| 2003/0018810 A1 | 1/2003 | Karagiannis et al. | |
| 2003/0058853 A1 | 3/2003 | Gorbatov et al. | |
| 2003/0101243 A1 | 5/2003 | Donahue et al. | |
| 2003/0104814 A1 | 6/2003 | Gwon et al. | |
| 2003/0119506 A1 | 6/2003 | Singhai et al. | |
| 2003/0126262 A1 | 7/2003 | Yoshida et al. | |
| 2003/0217145 A1 | 11/2003 | Leung et al. | |
| 2003/0217180 A1 | 11/2003 | Chandra et al. | |
| 2003/0224788 A1 | 12/2003 | Leung et al. | |
| 2004/0072557 A1 | 4/2004 | Paila et al. | |
| 2005/0286466 A1 | 12/2005 | Tagg et al. | |

OTHER PUBLICATIONS

"Wireless IP Network Standard", Version 3.0.0, Version Date: Jul. 16, 2001, 62 pages.

"Diameter Base Protocol", Calhoun et al., http://www.ietf.org/internet-drafts/draft-ietf-aaa-diameter-10.txt, Apr. 2002, 139 pages.

"Diameter Mobile Ipv4 Application", Calhoun et al, http://www.ietf.org/internet-drafts/draft-ietf-aaa-mobileip-10.txt, Apr. 2002, 48 pages.

Cardellini V. et al.: "Dynamic Load Balancing in Web-Server Systems", IEEE Internet Computing, May 1999, XP002170537.

Heissenhuber F. et al.: "Home Agent Redundancy and Load Balancing in Mobile IPV6", Broadband Communications, Proceedings of the International IFIP-IEEE Conference on Broadband Communications, XX, XX, Nov. 10, 1999, pp. 235-244, XP009002035.

Johnson D B et al.: "Mobility support in Ipv6", Internet Draft, XX,XX, Jun. 1, 2002, pp. I-V, 1-157, XP002963720.

International Search Report, Application No. PCT/US03/20106, Mailed Nov. 14, 2003; 4 pages.

Glass, S., "Mobile IP Agents as DHCP Proxies," Internet Draft, Sun Microsystems, Inc. Mar. 2, 2000.

Levkowetz, H. et al., "Mobile IP NAT/NAPT Traversal using UDP Tunneling," Internet Draft, Nov. 2001, 23 pages.

Khalil, Mohamed M. et al., "Generalized NAI (GNAI) Extension for Mobile IPv4," Internet Draft, Oct. 2001, 6 pages.

Adrangi, Farid and Prakash, Iyer, "Mobile IPv4 Traversal Across Firewalls," Internet Draft, Nov. 13, 2001, 30 pages.

Examiner's Communication pursuant to Article 96(2) EPC dated Mar. 1, 2006, from corresponding European Patent Application No. 03742214.4, Methods and Apparatus for Anchoring of Mobile Nodes Using DNS, 6 pages (CISCP293.EP).

Leung et al., U.S. Office Action dated Oct. 16, 2007 from related U.S. Appl. No. 10/150,377.

European Office Action dated Jun. 5, 2007 in related EP Application No. 03 742 214.4, 4 pgs.

Chandra et al., U.S. Office Action dated Jan. 23, 2008 from related U.S. Appl. No. 10/300,437.

Leung et al., U.S. Office Action dated Feb. 6, 2008 from related U.S. Appl. No. 10/150,377.

Leung et al., U.S. Office Action dated Apr. 19, 2007 from related U.S. Appl. No. 10/150,377.

Leung et al., U.S. Office Action dated Jul. 17, 2006 from related U.S. Appl. No. 10/150,377.

Leung et al., U.S. Office Action dated Jan. 25, 2006 from related U.S. Appl. No. 10/150,377.

Leung et al., U.S. Office Action dated Oct. 7, 2005 from related U.S. Appl. No. 10/150,377.

Leung et al., U.S. Office Action dated Mar. 10, 2005 from related U.S. Appl. No. 10/150,377.

Leung et al., U.S. Office Action dated Feb. 21, 2007 from related U.S. Appl. No. 10/241,969.

Leung et al., U.S. Office Action dated Sep. 22, 2006 from related U.S. Appl. No. 10/241,969.

Leung et al., U.S. Office Action dated May 2, 2006 from related U.S. Appl. No. 10/241,969.

Chandra et al., U.S. Office Action dated Apr. 19, 2007 from related U.S. Appl. No. 10/300,437.

DHCP RFC 2131, IETF, www.ietf.org, pp. 1-12.

Chandra et al., U.S. Office Action dated Nov. 27, 2006 from related U.S. Appl. No. 10/300,437.

Chandra et al., U.S. Office Action dated Jun. 5, 2006 from related U.S. Appl. No. 10/300,437.

The Office Action issued on May 8, 2008 for Australian Patent Application No. 2003279928.

The provisional application for U.S. Appl. No. 60/362,251.

* cited by examiner

METHODS AND APPARATUS FOR ANCHORING OF MOBILE NODES USING DNS

CROSS-REFERENCE TO RELATED APPLICATIONS

This application claims the benefit of U.S. Provisional Application No. 60/362,251, filed Mar. 5, 2002, incorporated herein by reference in its entirety and for all purposes. This application is related to Ser. No. 10/150,377, filed May 17, 2002, incorporated herein by reference in its entirety and for all purposes, which also claims benefit of U.S. Provisional Application No. 60/362,251, filed Mar. 5, 2002.

BACKGROUND OF THE INVENTION

1. Field of the Invention

The present invention relates generally to mobile computing and more specifically to assigning a home agent to a mobile node.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one node and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3220 of the Network Working Group, C. Perkins, Ed., January 2002. Mobile IP is also described in the text "Mobile IP, The Internet Unplugged" by J. Solomon, Prentice Hall. Both of these references are incorporated herein by reference in their entireties and for all purposes.

The Mobile IP process and environment are illustrated in FIG. 1. A Mobile IP environment 100' includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R2 125. Router R2 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of that message are then forwarded over the Internet 105 to router R2 125 and ultimately to home agent 115. From its mobility binding table, home agent 115 recognizes that mobile node 110 is no longer attached to the home network segment 135. It then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 then strips the encapsulation and forwards the message to mobile node 110 on remote network segment 140. The packet forwarding mechanism implemented by the home agent 115 to the foreign agent 120 is often referred to as "tunneling."

One of the weaknesses of Mobile IP is the triangle routing introduced between the home agent, mobile node, and correspondent node, especially when the "distance" between them introduces high latency and more traffic load to network. Although several home agents may be geographically dispersed, Mobile IP requires the mobile node 110 anchor itself with a statically provisioned home agent 115.

SUMMARY OF THE INVENTION

The present invention provides methods and apparatuses for obtaining a home agent assignment. In one embodiment a mobile IP network device initiates a DNS query of a domain name representing a generic home agent. The domain name representing a generic home agent does not uniquely identify a specific home agent. After the DNS system processes the query, the mobile IP network device receives a DNS response identifying the IP address of a specific home agent. The mobile IP network device may be a mobile node, a foreign agent or a AAA server.

In another embodiment a mobile IP network device receives a DNS query of a domain name that represents a generic home agent, selects a specific home agent based upon predetermined metrics; and causes a DNS response identifying the IP address of the specific home agent to be sent. The predetermined metrics may, for example, include proximity, latency, load balancing, or some combination of these factors. Although the selection is typically performed by a content routing device, the receiving of the DNS query and the causing of a DNS response to be sent can be done by either a DNS server or the content routing device.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

The present invention uses existing Internet infrastructure to dynamically obtain a home agent for a mobile node that attempts to register with its network. The invention allows the mobile node to register with a dynamically assigned home agent in a variety of circumstances, including when no foreign agents are in the foreign network and authentication, authorization and accounting (AAA) processes are required to be performed. For example, the selected home agent may be the home agent that is geographically or topologically nearest and/or a home agent that has the lightest load.

Figure 1:
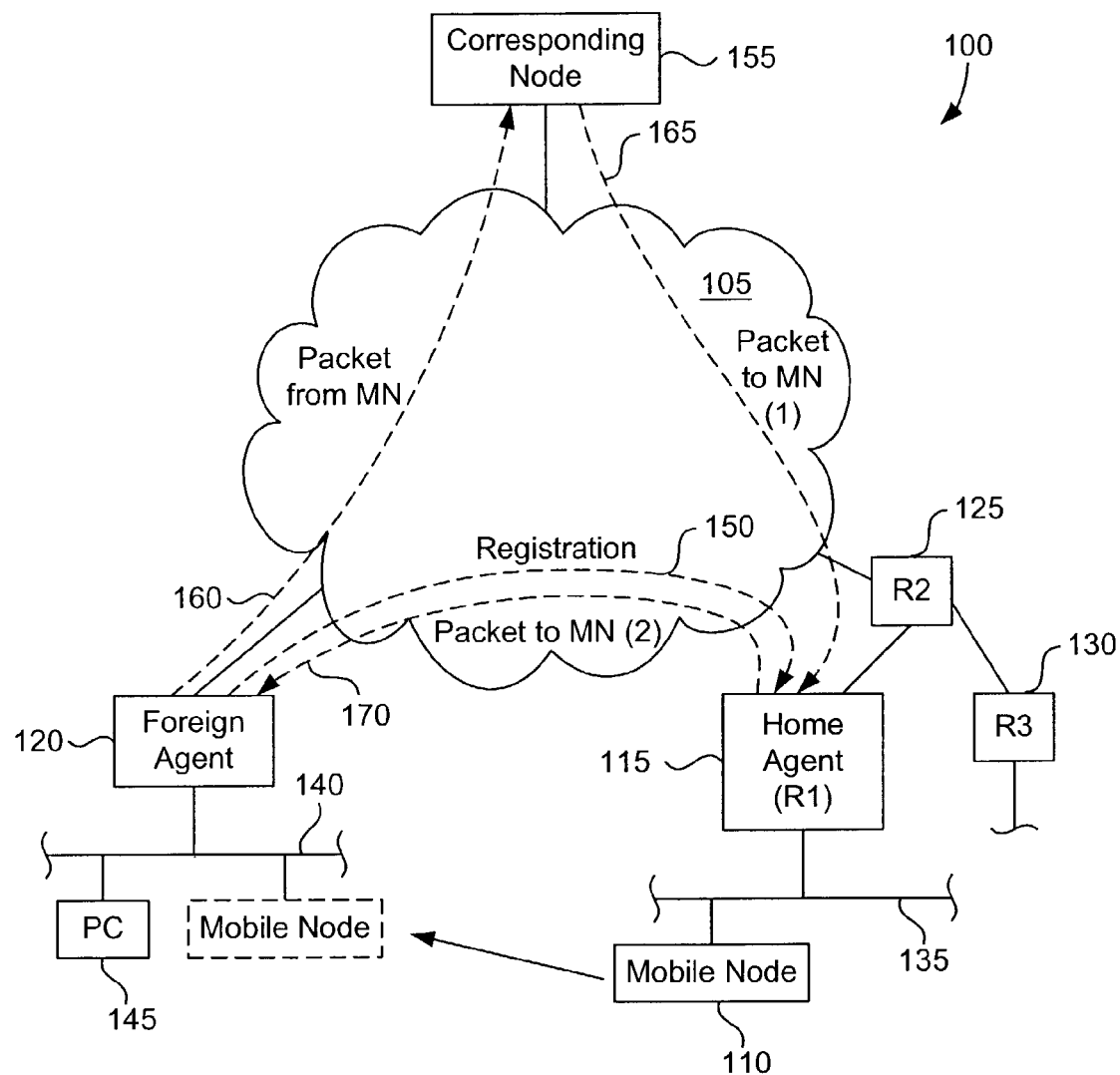
FIG. 1 is a block diagram of a Mobile IP environment.
Figure 2:
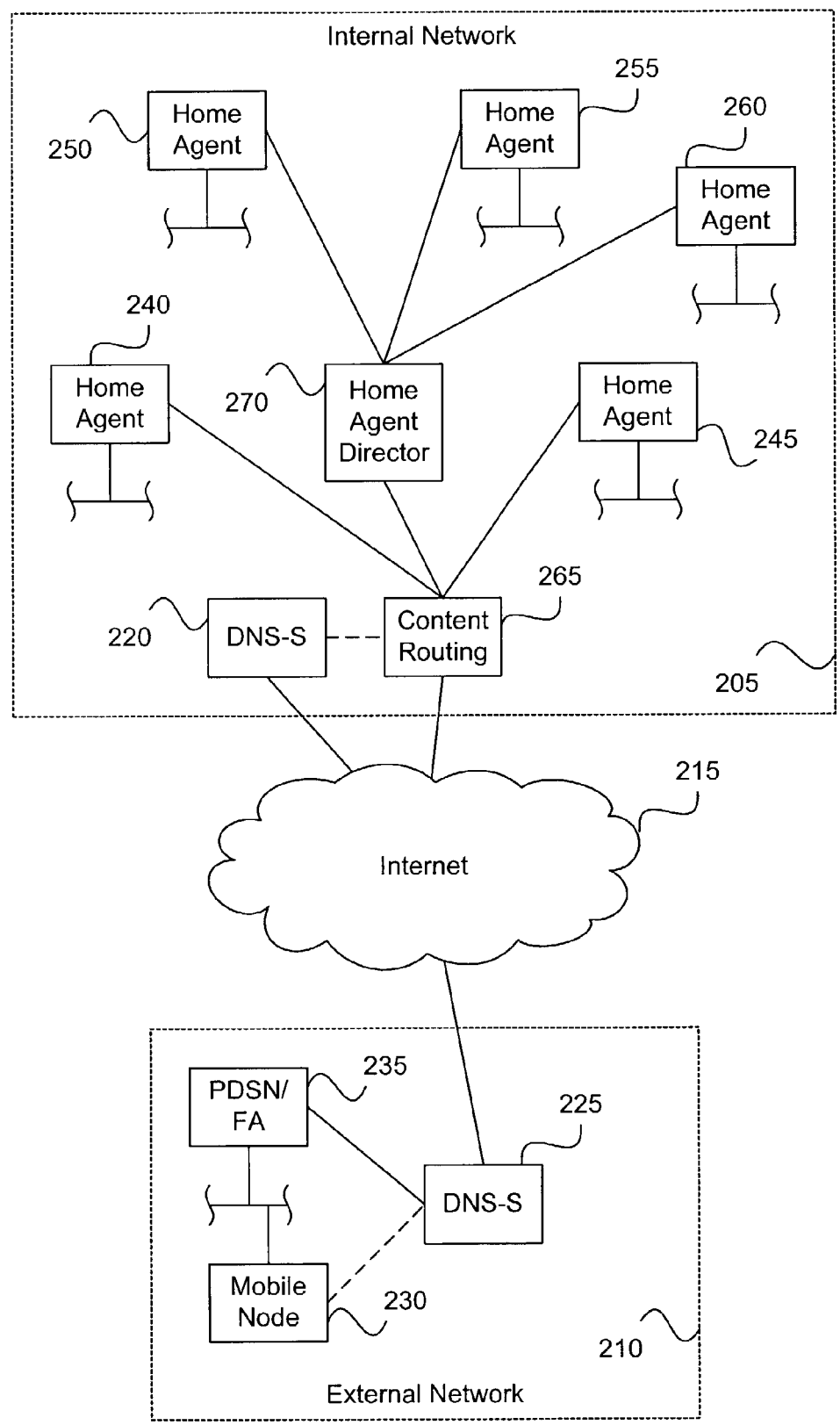
FIG. 2 is a block diagram illustrating an exemplary environment in which the present invention may be implemented.

FIG. 2 is a block diagram illustrating an exemplary environment in which the present invention may be implemented. An internal network 205 and a remote network 210 are connected to one another via an Internet 315. Networks that are connected to the Internet 215 rely upon Domain Name Service (DNS) to translate domain names into IP addresses. DNS allows the use of alpha-numeric names (e.g., www.cisco.com) in the place of numeric IP address (e.g., 198.133.219.25).

Although FIG. 2 shows both the internal network 205 as having a DNS server 220 and the external network 210 as having a DNS server 225, the DNS servers 220 and 225 can be hosted by a third party outside of those networks. DNS servers 220 and 225 typically have two components, a name server that supplies name-to-address conversions, and a resolver that queries other DNS servers when a name is not contained in the name server.

FIG. 2 additionally shows a mobile node 230 that has roamed to the external network 210 and communicates through a packet data serving node 235 (PDSN). The PDSN 235 acts as a gateway that enables packet data services in a code division multiple access (CDMA) environment. CDMA is a digital spread-spectrum modulation technique that is traditionally used with devices such as mobile phones. Although the PDSN 235 can optionally act as a foreign agent in some embodiments, it is not required.

As will be seen, the choice of which home agent 240 or 245 or home agent director 270 within the internal network 205 to assign to the mobile node 230 is made by a content routing device 265, such as the DistributedDirector product available from Cisco Systems, Inc. The DistributedDirector product is traditionally used as a way to transparently provide dynamic, scalable Internet traffic load distribution between multiple geographically dispersed servers. The DistributedDirector leverages routing table information in the network infrastructure to make network-intelligent load distribution decisions. With DistributedDirector, users need only a single domain name for accessing a globally distributed set of servers, thus providing the appearance of a single virtual server and eliminating the need for users to choose a server from a list of possible sites.

The content routing device 265 is similarly capable of dynamically selecting a home agent. Selection can be based upon any pre-determined metrics deemed important. Typically, the content routing device 265 will base its selection on topological proximity, latency, load balancing, or some combination of these factors.

The home agent director 270 is described in copending application titled "Methods And Apparatus For Mobile IP Dynamic Home Agent Allocation," by Kent K. Leung, Alpesh Patel, and Stefan B. Raab, filed May 6, 2002, Ser. No. 10/139, 941, incorporated herein by reference in its entirety and for all purposes. The home agent director 270 is used to provision home agents 250, 255 and 260. However, the home agent director 270 provisions its home agents 250, 255 and 260 in response to a registration request, and not a DNS query like the content routing device 265.

For the remainder of this document, including the appended claims, the term "home agent" without a specific reference number, shall include home agents, home agent directors and any other devices that appear to generally function as a home agent from the perspective of the content routing device 265 (e.g., MIP proxies, as described in either the IETF working group draft, "Mobile IPv4 Traversal Across VPN Gateways," F. Adrangi and P. Iyer, draft-adrangi-mobileip-natvpn-traversal-01.txt, Nov. 13, 2001, incorporated herein by reference in its entirety and for all purposes, and previously mentioned co-pending application identified by Ser. No. 10/150,377.

Figure 3A:
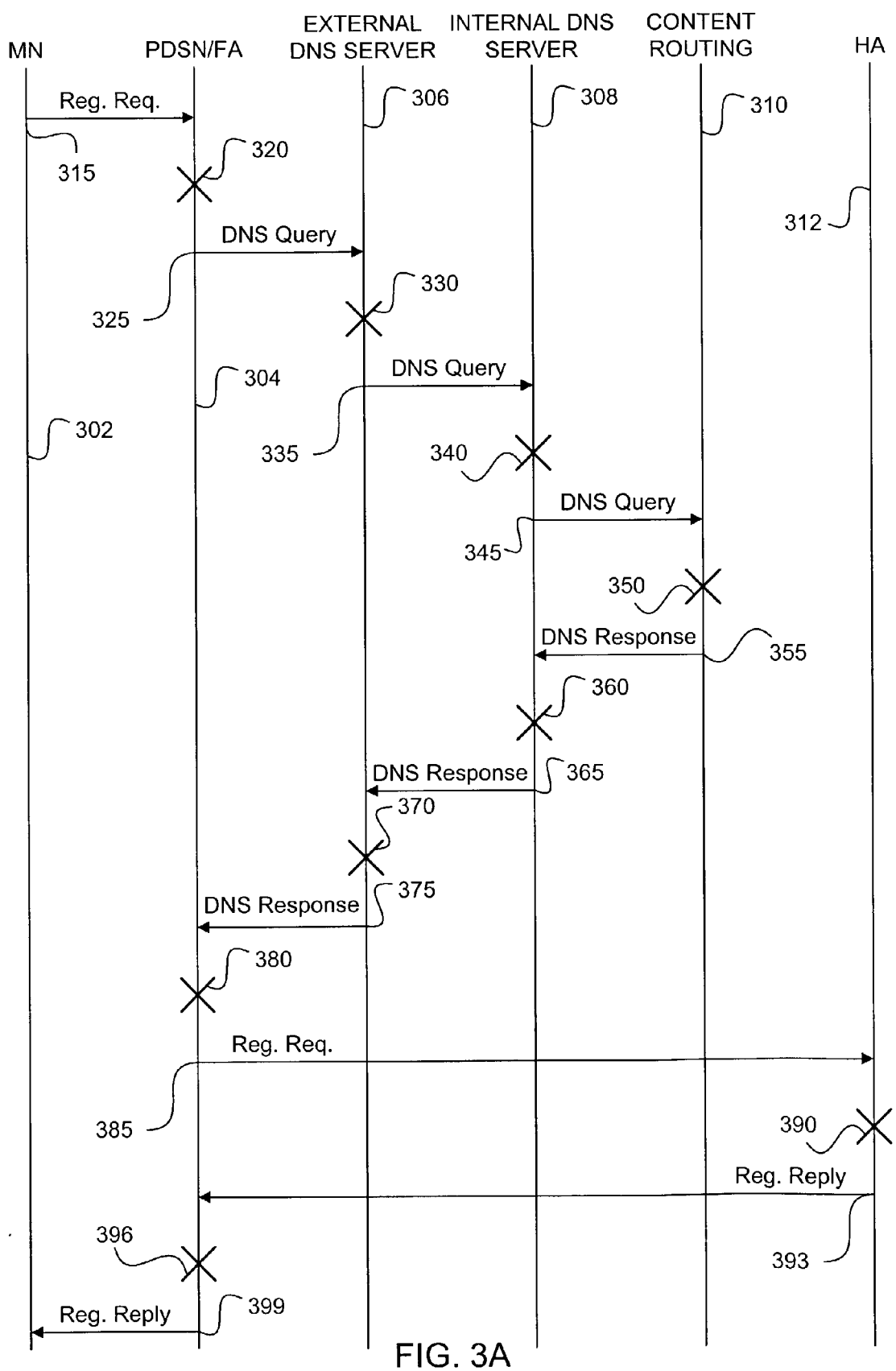
FIG. 3A is a control flow diagram illustrating a method of processing a registration request originating on the external network via the PDSN/FA, in accordance with an embodiment of the invention.

FIG. 3A is a control flow diagram illustrating a method of processing a registration request originating on the external network 210 via the PDSN 235, in accordance with an embodiment of the invention. The registration request would be routed through the PDSN 235, either because it is acting as a foreign agent or the R bit of the registration request has been set. The R bit informs the mobile node 230 that, even though it is being assigned a co-located care-of address, it must still register via the PDSN 235 (allowing the PDSN to perform AAA functions). Steps performed by the mobile node 230, PDSN 235, external network's DNS server 225, internal network's DNS server 220, content routing device 265, and home agent are represented by corresponding vertical lines 302, 304, 306, 308, 310 and 312.

At 315 the mobile node 230 sends the PDSN 235 a registration request, identifying a generic home agent using a domain name, such as ha.cisco.com. In a preferred embodiment the home agent address field is set to 0.0.0.0 or 255.255.255.255 (signaling that a home agent has not yet been assigned) and the generic home agent domain name is provided in a generalized network access identifier extension (GNAIE). The GNAIE is fully described in the IETF working group draft "Generalized NAI (GNAI) Extension for Mobile IPv4," Khalil, M., Qaddoura, E, Akhtar, H., and Calhoun, P., draft-ietf-mobileip-gnaie-05.txt, October 2001, incorporated herein by reference in its entirety and for all purposes. In such an embodiment, the PDSN 235 would need to be capable of parsing and interpreting the GNAIE correctly. As one skilled in the art will appreciate, the registration request can be set up differently, depending on the other components of the system.

At 320 the PDSN 235 recognizes that it has been given a domain name and forms a DNS query to convert the domain name into an IP address. At 325, the PDSN 235 sends a DNS query to the external DNS server 225 to look up the IP address of the domain name. If complete translation (recursive resolution) is requested, the DNS server 225 will contact other DNS servers in order to return an answer. If iterative resolution is requested, the DNS server 225 replies to the PDSN 235 with a DNS server that should be contacted next to resolve the domain name. Although recursive resolution is described in connection with FIG. 3A, it should be appreciated that iterative resolution could also be used, not just for the embodiment in FIG. 3A, but also in connection with FIGS. 3B, 4 and 5.

At 330, the external DNS server 225 checks its name server and, if recursive resolution was requested, determines that it must act as a resolver to convert the domain name and forms a DNS query at 335. The DNS system eventually routes the query to the internal network's DNS server 220. At 340 the DNS server 220 checks its tables and recognizes the domain name as being associated with the domain name for the content routing device 265 (e.g., distributeddirector.cisco.com). Optimally, the DNS server 220 would then attempt to resolve the domain name itself and, at 345, send a modified DNS query to the content routing device 265 requesting translation of the domain name for the content routing device 265.

As one skilled in the art will appreciate, numerous variations of the above steps are possible. For example, although FIG. 3 was described with an intelligent DNS server 220 that routed a modified DNS query directly to the content routing device 265, the system could also work if the DNS server 220 returned the domain name for the content router (e.g., distributeddirector.cisco.com) back to the PDSN 235 in a DNS response. The PDSN 235 would then initiate a new DNS query in order to resolve the domain name of the content routing device 265 (e.g., distributeddirector.cisco.com). Alternatively, if the content routing device 265 also acted as the main DNS server for the internal network 205, steps 335 and 340 would be unnecessary. The content routing device 265 would act on the initial DNS query as (e.g., ha.cisco.com) as if it were the modified DNS query formed at 345 (e.g., distributeddirector.cisco.com). Another alternative might be for the mobile node 230 to use a generic home agent address that uses the domain name of the content routing device 265 (e.g., distributeddirector.cisco.com), also skipping steps 335 and 340. Yet another alternative would be for the internal network's DNS server 220 to be programmed to directly alert the content routing device 265 that the trigger DNS query (e.g., ha.cisco.com) was sent using a mechanism other than DNS. In such a case the content routing device could either instruct the DNS server 220 to prepare a DNS response with the IP address of the selected home agent or generate its own DNS response.

Referring back to FIG. 3A, at step 350 the content routing device 265 recognizes the DNS query as a trigger to perform a dynamic home agent assignment. If a DistributedDirector is used, it is programmed to select a home agent from the available home agents, using whatever metrics are deemed to be important. For instance, the DistributedDirector can be programmed with IP addresses of home agents 240 and 245 as well as the home agent director 270. The DistributedDirector then performs queries for information such as load and routing proximity using the Director Response Protocol (DRP), developed by Cisco Systems, Inc. or some similar protocol.

Once a home agent is assigned, the content routing device 265 sends a DNS response back to the DNS server 220 at 355. The DNS response would be the IP address (called a DNS "A" resource record) of either the home agent director 270 or one of the home agents 240 or 245. In a preferred embodiment, the DNS response is sent with a time to live (TTL) field of zero (to prevent local caching so later mobile nodes would not be assigned the same home agent). As previously noted, if the home agent director 270 were assigned, it would then be responsible for assigning one of its home agents 250, 255 and 260 once the home agent director 270 received a registration request at step 390. At 360 the DNS server 220 processes the DNS response and at 365 forwards it to the external DNS server 225. At 370 the external DNS server 225 processes the DNS response and at 375 forwards it to the PDSN 235.

At 380 the PDSN 235 processes the registration request from step 315 normally in accordance with RFC 3220, forwarding it at 385 to the appropriate home agent director 270 or home agent 240 or 245 by setting the destination IP address in the registration request to the IP address of the home agent returned in the DNS response. Similarly, the processing at 390, 393, 396 and 399 in which the home agent processes the registration request, composes and sends a registration reply, which is then processed at the PDSN 235 and forwarded to the mobile node 230, could also be implemented in accordance with RFC 3220.

Figure 3B:
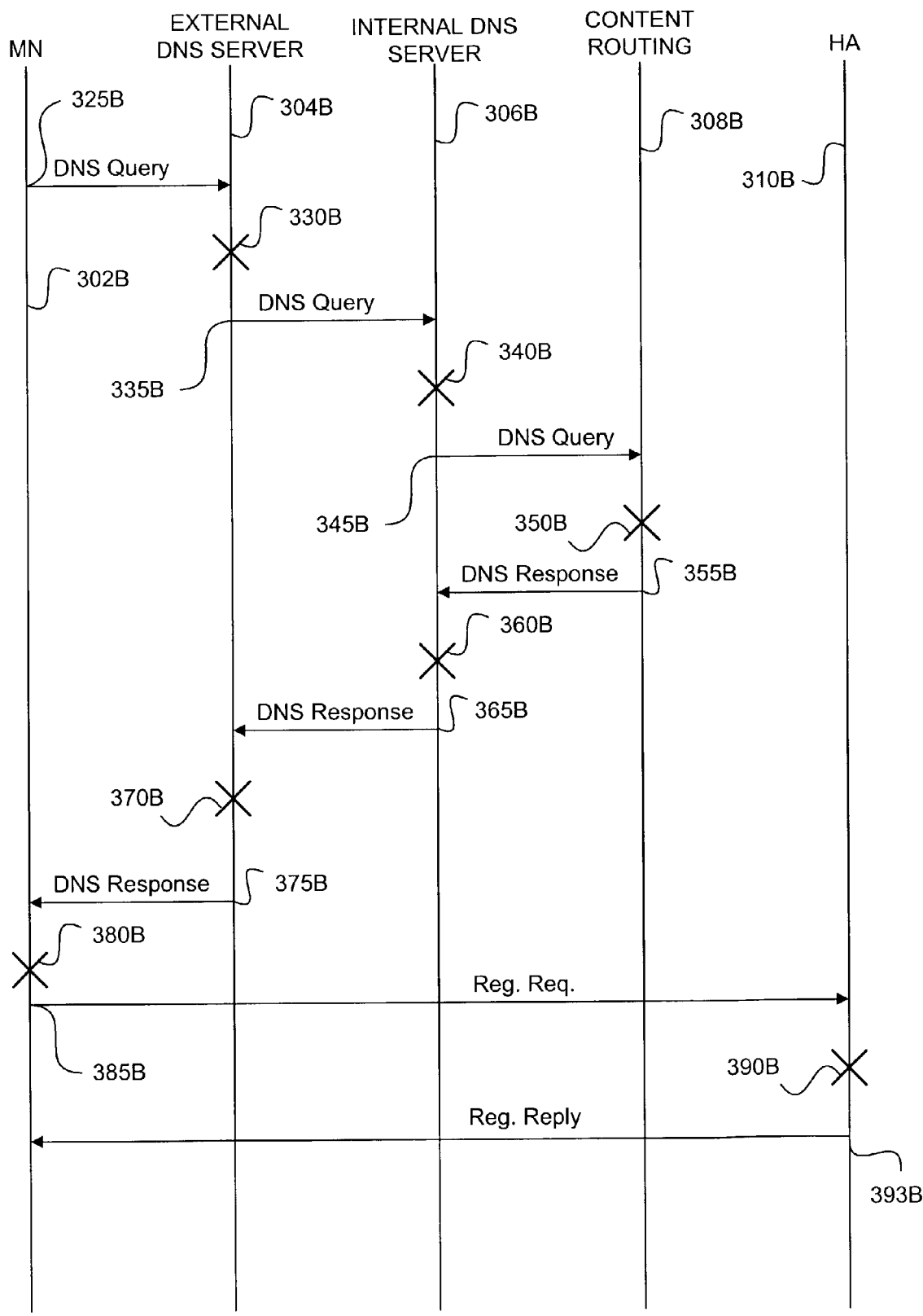
FIG. 3B is a control flow diagram illustrating a method of processing a registration request originating on the external network without using a PDSN/FA, in accordance with an embodiment of the invention.

FIG. 3B is a control flow diagram illustrating a method of processing a registration request originating on the external network 210 without using a PDSN 235, in accordance with an embodiment of the invention. In other words, the mobile node 230 initiates the DNS query and performs registration via a co-located care-of address. The steps 325B-393B are nearly identical to steps 325-393 described in FIG. 3A, except the mobile node 230 initiates and receives the responses to both the DNS query and the registration request. The mobile node 230 cannot rely on any other device to initiate the DNS query and registration request when a foreign agent is not present in the external network.

As shown at 325B, the mobile node 230 sends a DNS query to the external DNS server 225. When the DNS server cannot map the domain name to an IP address at 330B, it sends a DNS query at 335B to the internal DNS server 220. The internal DNS server 220 processes the DNS query at 340B and sends a DNS response at 345B to the external DNS server 225. The external DNS server 225 processes the DNS response at 350B and sends a DNS query at 355B to the content routing device 265. The content routing device processes the DNS query at 360B and sends a DNS response at 365B including the IP address of the assigned home agent.

When the external DNS server 225 receives the DNS response, it processes the DNS response at 370B and sends the DNS response at 375B to the mobile node 230. The mobile node 230 then processes the DNS response at 380B, composes a registration request with the home agent field including the IP address returned in the DNS response and sends the registration request at 385B to the home agent or PDSN 235 if the R bit was set in the advertisement. The home agent processes the registration request at 390B and sends a registration reply at 393B to the mobile node 230.

Figure 4:
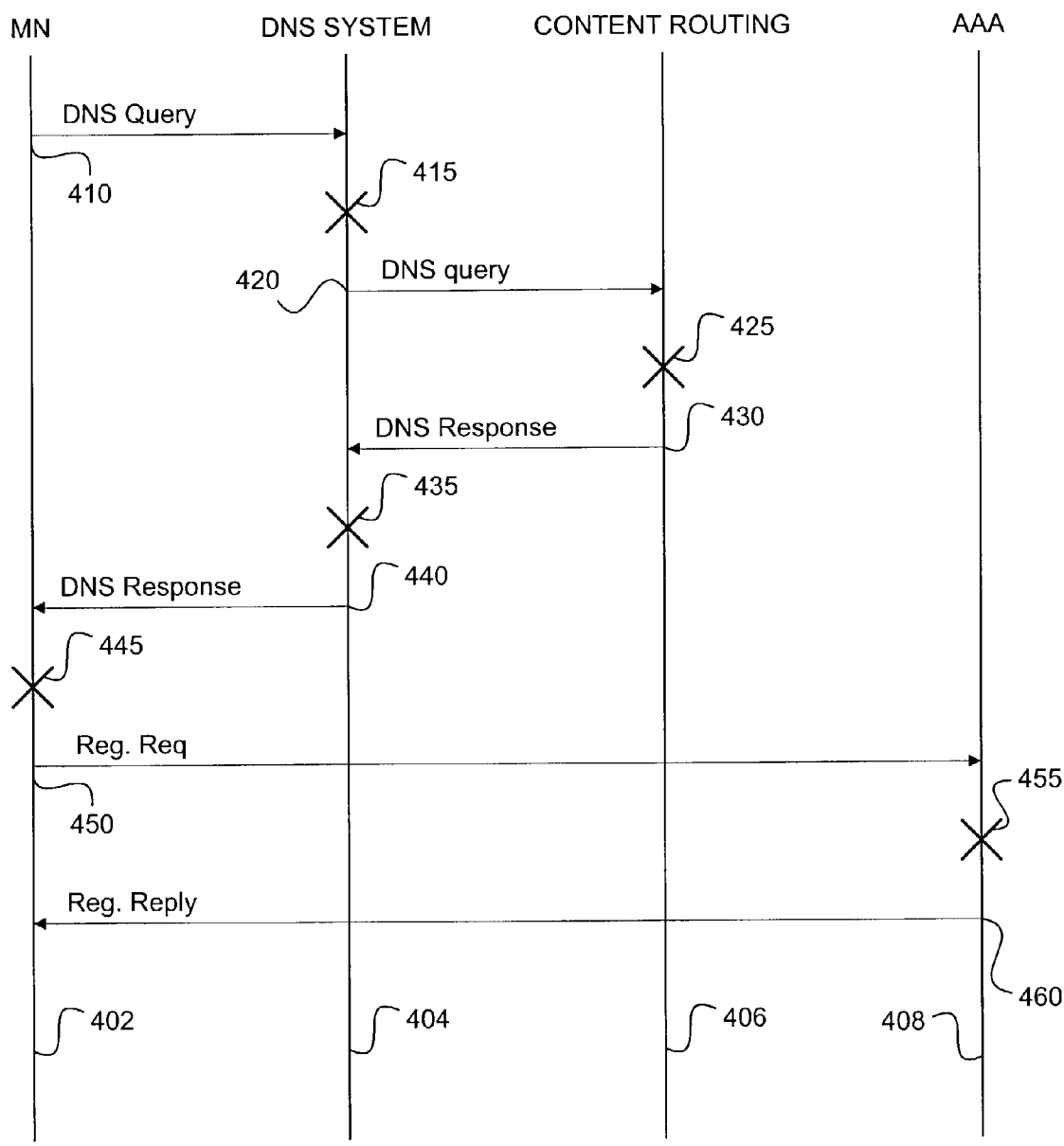
FIG. 4 is a control flow diagram illustrating a method of processing a registration request originating on the external network where the AAA server processes the registration request and the mobile node performs its own DNS query, in accordance with an embodiment of the invention.

FIG. 4 is a control flow diagram illustrating a method of processing a registration request originating on the external network 210 in accordance with an embodiment of the invention where an AAA server processes the registration request and the mobile node performs the DNS query. See the IETF working group draft "Diameter Mobile IPv4 Application," Calhoun, P., Johansson, T., Perkins, C., draft-ictf-aaa-diameter-mobileip-10.txt, April 2002, incorporated herein by reference in its entirety and for all purposes. Steps performed by the mobile node 230, the entire DNS system, content routing device 265, and AAA server are represented by corresponding vertical lines 402, 404, 406, and 408.

Requirements for interactions between AAA and Mobile IP are outlined in RFC 2977 of the Network Working Group, S. Glass, et al., October 2000, incorporated herein by reference in its entirety and for all purposes. A class of servers known as "AAA" or triple-A servers may be employed to perform authentication, authorization, and accounting functions. While authentication determines "who" an entity is, authorization determines what services a user is allowed to perform, or access. Various protocols such as the Remote Authentication Dial In User Service (RADIUS), TACACS+ and Diameter may be implemented to provide such a server. In order for the home agent or foreign agent to provide accounting information to the server, they must comply with formats required by the AAA server. RFC 2138 describes the RADIUS Protocol. Similarly, RFC 1492 describes TACACS, the Internet draft "The TACACS+ Protocol Version 1.78," draft-grant-tacacs-02.txt, describes TACACS+, and the Internet draft "Diameter Base Protocol," draft-ietf-aaa-diameter-10.txt describes Diameter. All of these documents are incorporated herein by reference for all purposes.

In step 410 the mobile node 230 sends a DNS query to the DNS system. The DNS system may include one or more DNS servers, such as those described in connection with FIG. 3A and FIG. 3B. At step 415 the appropriate processing is performed to generate a DNS query to the content routing device 265 at 420. Appropriate processing may include some of the same processing that was described in steps 325B through 375B in FIG. 3B.

At 425 the content routing device 265 interprets the domain name within the DNS query as a generic home agent and, based on whatever predetermined metrics are deemed important, selects a specific home agent. At 430 the content routing device 265 sends a DNS response that includes the IP address of the specific home agent back to the DNS system. Appropriate processing is performed by the DNS system at 435 and at 440 the DNS response is forwarded to the mobile node 230. Once the mobile node 230 has the IP address of the specific home agent, processing could proceed normally at 445, 450, 455 and 460.

Figure 5:
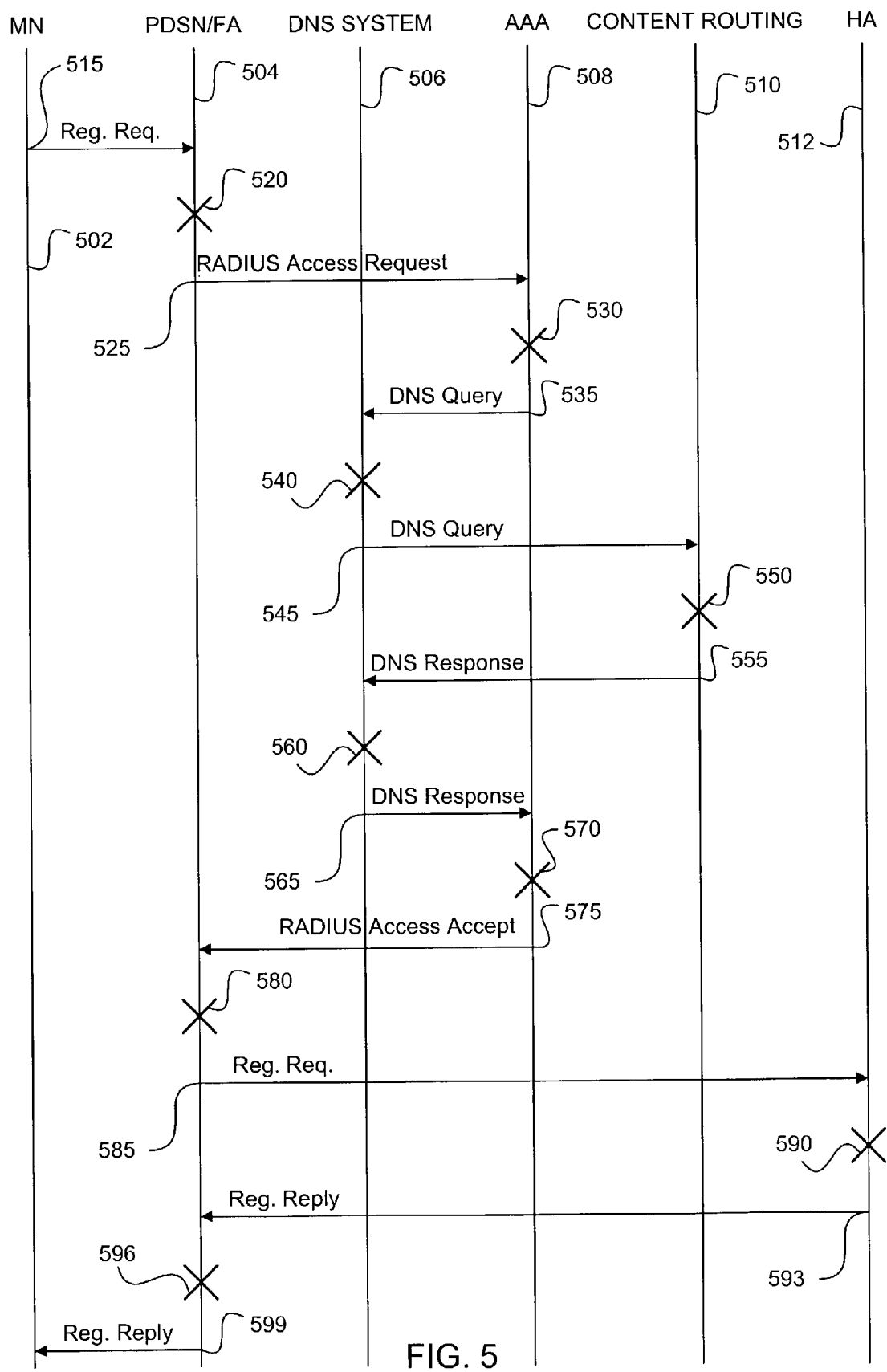
FIG. 5 is a control flow diagram illustrating a method of processing a registration request originating on the external network where the AAA server initiates the DNS query and the PDSN/FA processes the registration request, in accordance with an embodiment of the invention.

FIG. 5 is a control flow diagram illustrating a method of processing a registration request originating on the external network 210 in accordance with an embodiment of the invention where the AAA server initiates the DNS query and the PDSN 235 processes the registration request. Steps performed by the mobile node 230, PDSN 235, the entire DNS system, the AAA server, the content routing device 265, and the specific home agent are represented by corresponding vertical lines 502, 504, 506, 508, 510 and 512.

At 515 the mobile node 230 sends a registration request to the PDSN 235. A Mobile Node-AAA Authentication Extension (MN-AAA AE) is appended to the registration request, which includes a security association that is shared by the Mobile Node and the AAA server. At 520 the PDSN 235 processes the request and, in its capacity as foreign agent, sends an access request to the AAA server at 525. In accordance with one embodiment, the access request is a RADIUS access request that includes a vendor specific attribute (VSA) that identifies the home agent address. See the 3GPP2 "Wireless IP Network Standard," P.S0001-A, version 3.0.0, Jul. 16, 2001, incorporated herein by reference in its entirety and for all purposes. As previously described, the home agent address is a generic home agent domain name. At 530 the AAA server recognizes the home agent address is a domain name. At 535 the AAA server sends a DNS query into the DNS system to resolve the domain name. At 540 the DNS system processes the request, eventually sending a DNS query to the content routing device 265 at 545. At 550 the content routing device 265 identifies a specific home agent, and at 555 the content routing device 265 sends a DNS response identifying the IP address of the specific home agent back into the DNS system. The DNS system processes the response at 560 and forwards the response to the AAA server at 565. At 570 the AAA server performs its authentication, authorization and accounting functions and sends an acceptance (e.g., RADIUS access accept) back to the PDSN 235 at 575. The PDSN 235 is then able to create a properly formed registration request at 580, including the IP address of the specific home agent. At 585 the PDSN 235 sends the registration request to the appropriate home agent. Normal processing occurs at 590, 593, 596 and 599 in accordance with RFC 3220.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 6:
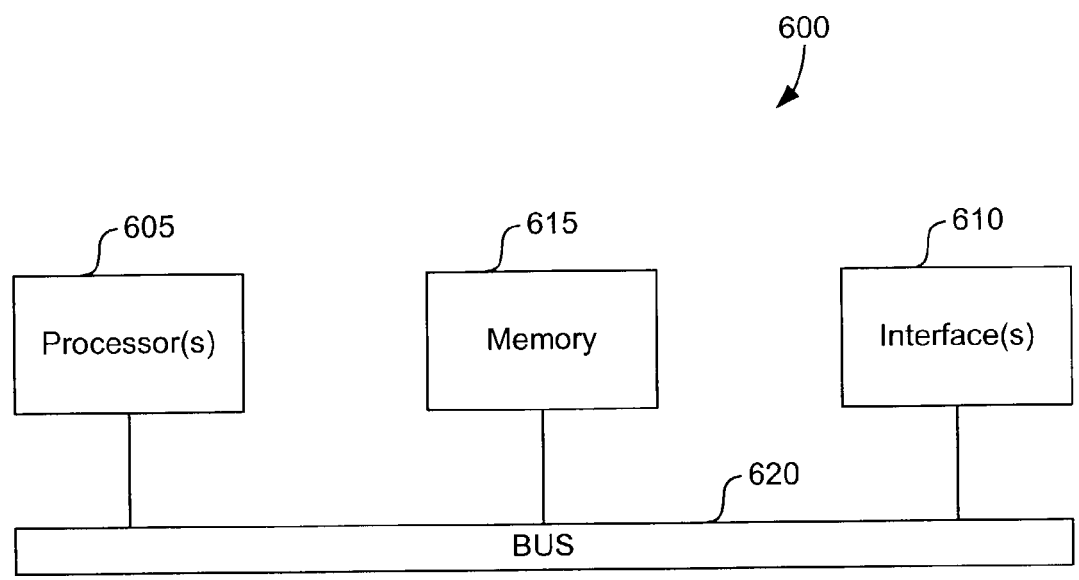
FIG. 6 is a diagram illustrating an exemplary network device in which various embodiments of the invention may be implemented.

Referring now to FIG. 6, a network device 600 suitable for implementing the techniques of the present invention includes a master central processing unit (CPU) 605, interfaces 610, memory 615 and a bus 620. When acting under the control of appropriate software or firmware, the CPU 605 may be responsible for implementing specific functions associated with the functions of a desired network device. For example, when configured as an intermediate router, the CPU 605 may be responsible for analyzing packets, encapsulating packets, and forwarding packets for transmission to a set-top box. The CPU 605 preferably accomplishes all these functions under the control of software including an operating system (e.g. Windows NT), and any appropriate applications software.

CPU 605 may include one or more processors such as those from the Motorola family of microprocessors or the MIPS family of microprocessors. In an alternative embodiment, the processor is specially designed hardware for controlling the operations of network device 600.

The interfaces 610 are typically provided as interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 605 to efficiently perform routing computations, network diagnostics, security functions, etc.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 615) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:

1. A method of obtaining a home agent assignment comprising:
   initiating a DNS query of a domain name representing a generic home agent, wherein the DNS query functions as a trigger to perform dynamic home agent assignment of one of a plurality of home agents;
   receiving a DNS response identifying an IP address of a specific home agent, wherein the specific home agent is the one of the plurality of home agents that has been dynamically assigned in response to the DNS query,
   wherein, the domain name representing a generic home agent does not uniquely identify the specific home agent;
   obtaining the IP address of the specific home agent from the DNS response; and
   initiating a registration request identifying the IP address of the specific home agent obtained from the DNS response;
   wherein the IP address of the specific home agent obtained from the DNS response has been selected based upon one or more predetermined metrics, the one or more predetermined metrics including at least one of proximity, latency, or load balancing.

2. The method of claim 1 wherein the DNS query is initiated by a foreign agent.

3. The method of claim 2 where in the DNS response is received by the foreign agent.

4. The method of claim 1 wherein the DNS query is initiated by a AAA server.

5. The method of claim 4 wherein the DNS response is received by the AAA server.

6. The method of claim 1 wherein the DNS response is generated by a content routing device that responds to DNS queries by dynamically selecting a home agent from the plurality of home agents and initiating the DNS response identifying the IP address of the specific home agent.

7. The method of claim 1 wherein the method is performed in a Mobile IP environment.

8. A computer-readable medium storing thereon computer-readable instructions that when executed by a processor obtains a home agent assignment, comprising:
   instructions for initiating a DNS query of a domain name representing a generic home agent, wherein the DNS query functions as a trigger to perform dynamic home agent assignment of one of a plurality of home agents;
   instructions for obtaining an IP address of a specific home agent from a DNS response that is received, wherein the specific home agent is the one of the plurality of home agents that has been dynamically assigned in response to the DNS query, wherein, the domain name representing a generic home agent does not uniquely identify the specific home agent; and instructions for initiating a registration request identifying the IP address of the specific home agent obtained from the DNS response;

wherein the IP address of the specific home agent obtained from the DNS response has been selected based upon one or more predetermined metrics, the one or more predetermined metrics including at least one of proximity, latency, or load balancing.

9. A mobile IP network device comprising:

a processor; and a memory, operably connected with the processor, at least one of the processor or the memory being configured for:

initiating a DNS query of a domain name representing a generic home agent, wherein the DNS query functions as a trigger to perform dynamic home agent assignment of one of a plurality of home agents; and receiving a DNS response identifying an IP address of a specific home agent, wherein the specific home agent is the one of the plurality of home agents that has been dynamically assigned in response to the DNS query, wherein, the domain name representing a generic home agent does not uniquely identify the specific home agent;

obtaining the IP address of the specific home agent from the DNS response; and initiating a registration request identifying the IP address of the specific home agent obtained from the DNS response;

wherein the IP address of the specific home agent obtained from the DNS response has been selected based upon one or more predetermined metrics, the one or more predetermined metrics including at least one of proximity, latency, or load balancing.

10. A method of assigning a home agent to a mobile node comprising:

receiving a DNS query of a domain name that represents a generic home agent, wherein the DNS query functions as a trigger to perform dynamic home agent assignment of one of a plurality of home agents;

selecting, in response to the DNS query, a specific home agent from the plurality of home agents based upon one or more predetermined metrics, the one or more predetermined metrics including at least one of proximity, latency, or load balancing; and causing a DNS response identifying an IP address of the specific home agent to be sent.

11. The method of claim 10 wherein the DNS query is received by a content routing device and the specific home agent is selected by the content routing device.

12. The method of claim 11 wherein the DNS response is sent by the content routing device.

13. The method of claim 11 wherein the DNS query is sent by a DNS server.

14. The method of claim 10 wherein the DNS query is received by a DNS server and the specific home agent is selected by a content routing device.

15. The method of claim 14 wherein the DNS response is sent by the DNS server.

16. The method of claim 14 wherein the DNS response is sent by the content routing device.

17. A computer-readable medium storing thereon computer-readable instructions that when executed by a processor causes an assignment of a home agent in response to a DNS query, comprising:

receiving a DNS query of a domain name that represents a generic home agent, wherein the DNS query functions as a trigger to perform dynamic home agent assignment from a plurality of home agents;

selecting, in response to the DNS query, a specific home agent from the plurality of home agents based upon one or more predetermined metrics, the one or more predetermined metrics including at least one of proximity, latency, or load balancing; and causing a DNS response identifying an IP address of the specific home agent to be sent.

18. A mobile IP network device comprising:

a processor; and memory, operably connected with the processor, at least one of the processor or the memory being configured for:

receiving a DNS query of a domain name that represents a generic home agent, wherein the DNS query functions as a trigger to perform dynamic home agent assignment of one of a plurality of home agents;

selecting, in response to the DNS query, a specific home agent from the plurality of home agents based upon predetermined metrics, the one or more predetermined metrics including at least one of proximity, latency, or load balancing; and causing a DNS response identifying an IP address of the specific home agent to be sent.

19. A Mobile IP network device adapted for obtaining a home agent assignment comprising:

means for initiating a DNS query of a domain name representing a generic home agent, wherein the DNS query functions as a trigger to perform dynamic home agent assignment of one of a plurality of home agents; and means for receiving a DNS response identifying an IP address of a specific home agent, wherein the specific home agent is the one of the plurality of home agents that has been dynamically assigned in response to the DNS query;

wherein, the domain name representing a generic home agent does not uniquely identify the specific home agent;

obtaining the IP address of the specific home agent from the DNS response; and means for initiating a registration request identifying the IP address of the specific home agent obtained from the DNS response;

wherein the IP address of the specific home agent obtained from the DNS response has been selected based upon one or more predetermined metrics, the one or more predetermined metrics including at least one of proximity, latency, or load balancing.

20. A method of assigning a home agent to a mobile node comprising:

receiving a DNS query of a domain name, wherein the DNS query functions as a trigger to perform dynamic home agent assignment of one of a plurality of home agents;

selecting, in response to receiving the DNS query, a specific home agent from the plurality of home agents based upon one or more predetermined metrics, the one or more predetermined metrics including at least one of proximity, latency, or load balancing; and causing a DNS response identifying an IP address of the specific home agent to be sent.

* * * * *